United States Patent Office 3,118,915
Patented Jan. 21, 1964

3,118,915
2α-LOWER ALKYL DIHYDRO TESTOSTERONE AND DERIVATIVES THEREOF
Howard J. Ringold and George Rosenkranz, Mexico City, Mexico, assignors, by mesne assignments, to Syntex Corporation, a corporation of Panama
No Drawing. Filed Jan. 21, 1960, Ser. No. 3,747
Claims priority, application Mexico Feb. 24, 1959
30 Claims. (Cl. 260—397.4)

The present invention relates to novel cyclopentanophenanthrene derivatives and to a process for the production thereof.

More particularly the invention relates to novel androgenic hormones which are 2α-lower alkyl and 2α-aralkyl derivatives of dihydro-testosterone (androstane-17β-ol-3-one), 19-nor-dihydrotestosterone, 17α-lower alkyl derivatives and 17-esters thereof.

The novel compounds are active hormones of the androgenic type which differ substantially in their characteristics from the same compounds without the substituent at C–2 especially in that they possess superior anabolic action and anti-estogenic activity.

In accordance with the present invention it has been discovered the novel compounds just described may be prepared by reacting dihydrotestosterone or 17α-lower alkyl-dihydro testosterone with ethyl formate and alkali metal hydride to form the corresponding 2-hydroxymethylene derivative, followed by reaction of the 2-hydroxymethylene derivative with an alkyl or aralkyl iodide to form the corresponding 2-alkyl or aralkyl-2′-formyl derivative. Removal of carbon monoxide from these last mentioned derivatives produced the novel active 2-alkyl or aralkyl compounds.

It has also been discovered in accordance with the present invention that the novel compounds of this invention may be prepared from testosterone or 17α-alkyl testosterone by forming the 2-hydroxymethylene derivatives and then the 2-alkyl or aralkyl derivatives in the same manner as described above. Reduction of the 2-alkyl or aralkyl testosterone by hydrogenation in the presence of a hydrogenation catalyst, especially a platinum or palladium catalyst, produces the 2-alkyl or aralkyl dihydro-testosterone or 17α-alkyl-dihydrotestosterone.

Reduction of the 3-keto compounds with sodium borohydride gave the corresponding 3-alcohols.

Similarly, the known 19-nor-testosterone or 19-nor-17α-lower alkyl testosterones may be treated with ethyl formate and alkali metal hydride to form the corresponding 2-hydroxymethylene derivatives, which are key intermediates and active hormones of the type previously set forth. Treatment of the 2 - hydroxymethylene - 19 - nor compounds with a lower alkyl or aralkyl iodide gave the corresponding 2-lower alkyl or aralkyl-2′-formyl derivatives which upon removal of carbon monoxide gave the corresponding active 2-lower alkyl or aralkyl compounds. Hydrogenation of the Δ⁴-3-keto compounds gave the corresponding saturated derivatives which could also be reduced to the 3-alcohols.

Conventional esterification gave the active corresponding esters.

The novel active compounds of the present invention may therefore be characterized by the following formulae:

In the above formulae, R represents a lower alkyl group of less than 7 carbon atoms, preferably methyl, ethyl or propyl, or an aralkyl group such as benzyl; R′ represents hydrogen or lower alkyl; R² represents hydrogen or an acyl group derived from a hydrocarbon carboxylic acid of less than 12 carbon atoms or an inorganic acid such as sulfonic acids, sulfuric acid, phosphoric acid and hydrogen halides. The carboxylic acids may be straight or branched chain, saturated or unsaturated, cyclic or mixed cyclic aliphatic, unsubstituted or substituted with halogen, methoxy or other groups. Typical ester groups are the acetate, propionate, butyrate, hemisuccinate, cyclopentylpropionate, enanthate, phenylpropionate, benzoate, caproate, trimethylacetate, phenoxyacetate, acetoacetate, aminoacetate, and β-chloropropionate. The esterified compounds may also be in the form of water-soluble salts such as for example, the alkali metal salts of the hemisuccinates or the disodium salt of a phosphate or the hydrohalide salts of esters formed with amino acids.

The novel compounds of the present invention may be prepared by the processes exemplified by the following equations:

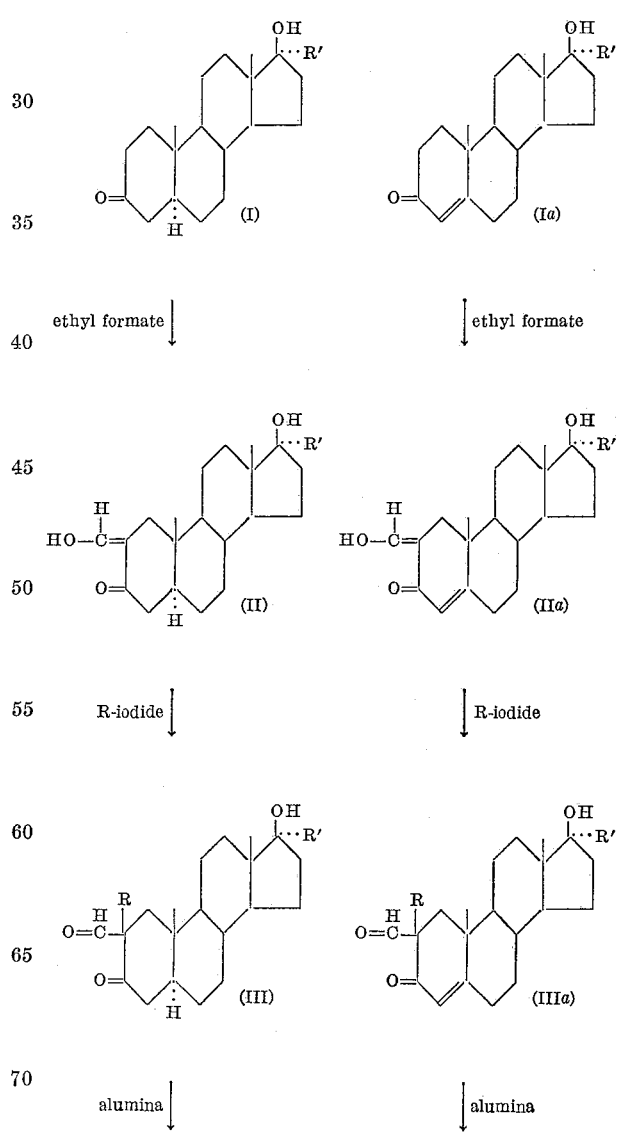

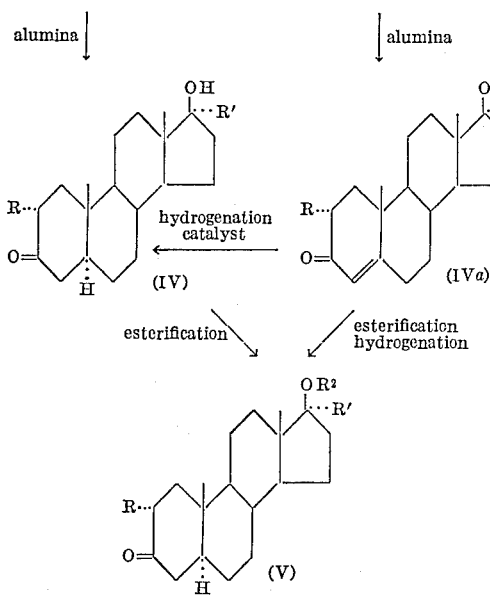

In the above equations, R, R' and R² represent the same groups as heretofore set forth.

In following the process outlined above, the known 19-nor-testosterone or 19-nor-17α-lower alkyl testosterone may be used to prepare the corresponding 2-alkyl or aralkyl-19-nor-testosterone or 19 - nor - 17α - lower alkyl testosterones.

In practicing the process set forth above, the starting compound which may be testosterone, 17α-lower alkyl testosterone such 17α-methyl or 17α-ethyl or the corresponding 4-5 saturated derivative of the allo series i.e. androstan-17β-ol-3-one or 17α-methyl- or 17α-ethyl-androstan-17β-ol-3-one, is suspended in an inert organic solvent such as anhydrous benzene and is then mixed with ethyl formate and sodium hydride. The reaction mixture is then kept for a long period of time (of the order of one day) at room temperature under a nitrogen atmosphere. The excess of hydride is then decomposed by cautious addition of methanol. Cold water is then added to form two layers with the desired product in the water layer in the form of its sodium salt. The aqueous layer is separated, washed and acidified with dilute mineral acid such as hydrochloric acid and extracted with an organic solvent such as methylene chloride. From the organic solvent solution the desired 2-hydroxymethylene intermediate is obtained as by evaporation to dryness and recrystallization. The 2-hydroxymethylene compounds are treated in an organic solvent suspension with sodium hydride and with an alkyl or aralkyl iodide (preferably a lower alkyl or benzyl iodide) preferably under reflux conditions and under a nitrogen atmosphere. The reaction is continued for a long period of time, of the order of 72 hours, with successive increments of the iodide being added at intervals of 24 hours. The mixture is cooled, washed with dilute base to remove unreacted starting material; the product, namely the 2-alkyl or aralkyl-2'-formyl derivative, is recovered from the organic layer by evaporation and recrystallization.

The 2-alkyl or aralkyl-2'-formyl derivatives thus prepared were then treated with mild base, preferably activated alumina (chromatographic type) of alkaline reaction. This treatment involved passing a benzene solution of the compounds through a column of the alumina and after about a day's time, eluting the product from the column with an organic solvent such as ethyl acetate. The products after crystallization were the corresponding 2α-alkyl or aralkyl compounds, i.e. 2α-lower alkyl (such as methyl, ethyl or propyl) or benzyl derivatives of testosterone, 17α-lower alkyl testosterone or of the saturated compounds such as androstane-17β-ol-3-one or of 17α-lower alkyl-androstan-17β-ol-3-one. According to the above equation, the 2α-alkyl or aralkyl derivatives of testosterone or of the 17α-lower alkyl-testosterones are hydrogenated in the presence of a hydrogenation catalyst, preferably a palladium catalyst and more specifically palladium on barium sulfate catalyst. After separation of the catalyst, the two isomers formed, i. e.—the testane and androstane derivatives were separated by chromatography.

In practicing the process outlined above, similarly, the 19-nor testosterone or its 17α-lower alkyl derivatives, suspended in an inert solvent such as benzene and mixed with ethyl formate and sodium hydride, is maintained under nitrogen atmosphere for a period of time of about 5 hours. The salt mixture produced was then treated with acid such as dilute hydrochloric acid and the precipitate thus produced was the corresponding 2-hydroxymethylene-19-nor-testosterone or 17α-lower alkyl derivative thereof. By then following the procedure as set forth above, the 2α-alkyl or aralkyl-2'-formyl derivatives of 19-nor-testosterone and 19-nor-17α-lower alkyl-testosterone and the 2α-alkyl or aralkyl derivatives of 19-nor-testosterone and 19-nor-17α-lower alkyl testosterone were prepared. To form the corresponding saturated derivatives of 2α-alkyl and aralkyl-19-nor-testosterone or 19-nor-17α-lower alkyl testosterones, the Δ⁴-3-keto compounds are treated with lithium in liquid ammonia to hydrogenate the double bond.

The novel compounds of this invention are converted to esters by conventional methods of esterification. Esterification of the Δ⁴-3-keto compounds may be effected prior to hydrogenation to form the corresponding ester of the 4–5 saturated derivatives.

The following specific examples serve to illustrate but are not intended to limit the present invention:

*Example I*

2-hydroxymethylene-testosterone was prepared in accordance with the method of Weisenborn, Remy and Jacobs, J. Am. Chem. Soc., 76, 552 (1954).

2.2 g. of 2-hydroxymethylene-testosterone and 170 mg. of sodium hydride were suspended in 50 cc. of benzene and mixed with 10 cc. of methyl iodide and the mixture was refluxed under an atmosphere of nitrogen. After 24 hours, additional 10 cc. of methyl iodide was added, followed by 10 more cc. after 48 hours, and the refluxing was continued to a total of 72 hours. The cooled mixture was washed with 1% sodium hydroxide solution to remove traces of unreacted starting material and the organic layer was evaporated to dryness under reduced pressure. Crystallization of the residue from acetone-hexane afforded 2-methyl-2'-formyl-Δ⁴-androsten-17β-ol-3-one.

1 g. of the above compound was dissolved in benzene and the solution was used to impregnate a column with 100 g. of alkaline activated alumina. After 24 hours the column was eluted with ethyl acetate and the combined eluates were crystallized from acetone-hexane, thus giving 2α-methyl-testosterone melting point 155–157° C., [α]$_D$ +116° (CHCl₃).

Acetylation with acetic anhydride in pyridine solution by routine methods yielded the 17-acetate of 2α-methyltestosterone. There was also prepared by conventional reaction with acid anhydrides and acid halides, the propionate, cyclopentylpropionate, phenylpropionate and benzoate.

1 g. of 2α-methyltestosterone or its esters dissolved in 100 cc. of methanol (ethyl acetate may be used alternatively) was mixed with 100 mg. of 5% palladium on barium sulfate catalyst and hydrogenated in an atmosphere of hydrogen at atmospheric pressure and a temperature of 25° C. until the equivalent of one mol of hydrogen had been absorbed. The catalyst was filtered, the filtrate was evaporated to dryness and the residue was chromatographed in a column with activated alumina.

Elution of the column with mixtures of benzene and ether yielded first 2α-methyl-testan-17β-ol-3-one and then 2α-methyl-androstan-17β-ol-3-one or their esters.

The 17-phenylpropionate of 2α-methyl-androstan-17β-ol-3-one had a melting point of 132–5° C., [α]$_D$ +36° (chloroform); the 17-cyclopentylpropionate a melting point of 96–100° C., [α]$_D$ +34° (chloroform), and the propionate a melting point of 124–126° C. The free 2α-methyl-androstan-17β-ol-3-one had a melting point of 152–154° C., [α]$_D$ +32° (EtOH).

*Example II*

Following the method described in Example I, except that ethyl iodide was used instead of methyl iodide, there was obtained 2α-ethyltestosterone and 2α-ethyl-dihydrotesterone respectively.

*Example III*

Following the method described in Example I, except that propyl iodide was used instead of methyl iodide, there was obtained 2α-propyltestosterone and 2α-propyl-dihydrotesterone respectively.

*Example IV*

A mixture of 2.2 g. of 2-hydroxymethylene-testosterone, 170 mg. of sodium hydride and 50 cc. of benzene was treated with 10 cc. of benzyl iodide and the mixture was refluxed for 72 hours under an atmosphere of nitrogen. The cooled mixture was washed with previously cooled 1% sodium hydroxide solution and evaporated to dryness under reduced pressure. Crystallization from acetone-hexane gave 2-benzyl-2'-formyl-testosterone which upon treatment with alkaline activated alumina as in Example I, yielded 2-benzyl-testosterone.

*Example V*

A mixture of 20 g. of dihydrotestosterone, 250 cc. of benzene, 20 cc. of ethyl formate and 3 g. of sodium hydride was kept for one day at room temperature under an atmosphere of nitrogen. The excess of hydride was decomposed by the cautious addition of methanol and then diluted with 200 cc. of water. The aqueous layer was separated, washed with ether, acidified and dilute hydrochloric acid and extracted with methylene chloride. The methylene chloride solution was evaporated to dryness and the residue crystallized from acetone-hexane to produce 2-hydroxymethylene-dihydrotestosterone.

The 2-hydroxymethylene-dihydrotestosterone was treated with methyl iodide in accordance with the method described in Example I, thus giving 2-methyl-2'-formyl-dihydrotestosterone.

The 2-methyl-2'-formyl-dihydrotestosterone was treated with alkaline activated alumina in accordance with the method described in Example I, thus yielding 2α-methyl-androstan-17β-ol-3-one.

By a similar method using ethyl iodide then was prepared 2α-ethyl-androstan-17β-ol-3-one having a melting point of 169–172° C., [α]$_D$ +24° (EtOH).

*Example VI*

2-hydroxymethylene-17α-methyl-testosterone was prepared in accordance with the method of Weisenborn, Remy and Jacobs, J. Am. Chem. Soc., 76, 552 (1954), starting with 17α-methyl-testosterone.

2.3 g. of 2-hydroxymethylene-17α-methyl-testosterone and 170 mg. of sodium hydride suspended in 50 cc. of benzene was treated with 10 cc. of methyl iodide and the mixture was refluxed under an atmosphere of nitrogen. 10 additional cc. of methyl iodide was added after 24 hours, followed by 10 cc. more after 48 hours, and the refluxing was continued to a total of 72 hours. The cooled mixture was washed with 1% sodium hydroxide solution to remove traces of unchanged starting material and the organic layer was evaporated to dryness under reduced pressure. Crystallization of the residue from acetone-hexane afforded 2-methyl-2'-formyl-17α-methyl-Δ$^4$-androsten-17β-ol-3-one.

A solution of 1 g. of the above compound in benzene was used to impregnate a column of 100 g. of alkaline activated alumina. After 24 hours the column was eluted with ethyl acetate and the eluates were crystallized from acetone-hexane to produce 2α,17α-dimethyltestosterone melting point 150–152° C., [α]$_D$ +82° (CHCl$_3$).

A mixture of 1 g. of 2α,17α-dimethyl-testosterone, 100 cc. of methanol (ethyl acetate can be used alternatively) and 100 mg. of 5% palladium on barium sulfate catalyst was hydrogenated under an atmosphere of hydrogen at atmospheric pressure and 25° C. until the equivalent of one mol of hydrogen had been absorbed. The catalyst was filtered, the filtrate was evaporated to dryness and the residue was chromatographed in a column with activated alumina. Upon elution with mixtures of benzene and ether, there came out first the fractions of 2α,17α-dimethyl-testan-17β-ol-3-one and then the fractions of 2α,17α-dimethyl-androstan-17β-ol-3-one, melting point 151–154° C., [α]$_D$ +8° (CHCl$_3$).

*Example VII*

Following the method described in Example VI, except that ethyl iodide was used instead of methyl iodide, there were obtained 2α-ethyl-17α-methyl-testosterone and 2α-ethyl-17α-methyl-dihydrotestosterone (melting point 93–95° C.) respectively.

*Example VIII*

Following the method described in Example VI, except that propyl iodide was used instead of methyl iodide, there were obtained 2α-propyl-17α-methyl-testosterone and 2α-propyl-17α-methyl-dihydrotestosterone respectively.

*Example IX*

A mixture of 2.2 g. of 2-hydroxymethylene-17α-methyl-testosterone, 170 mg. of sodium hydride and 50 cc. of benzene was treated with 10 cc. of benzyl iodide and refluxed for 72 hours under an atmosphere of nitrogen. After cooling, the mixture was washed with previously cooled 1% sodium hydroxide solution and then evaporated to dryness under reduced pressure. Crystallization from acetone-hexane gave 2-benzyl-2'-aldehydo-17α-methyl-testosterone.

Further treatment of this compound in accordance with the method described in Example VI, produced 2α-benzyl-17α-methyl-testosterone and 2α-benzyl-17α-methyl-dihydrotestosterone.

*Example X*

Following the method described in Example VI, but starting from 2-hydroxymethylene-17α-ethyl-testosterone instead of the 17α-methyl homologue, there was obtained 2α-methyl-17α-ethyl-testosterone (melting point 141–143° C., [α]$_D$ +88°) and 2α-methyl-17α-ethyl-androstan-17β-ol-3-one (melting point 128–131° C. [α]$_D$ +6°).

*Example XI*

Following the method described in Example VI, but starting from 2-hydroxymethylene-17α-propyl-testosterone instead of the 17α-methyl homologue, there was obtained 2α-methyl-17α-propyl-testosterone and 2α-methyl-17α-propyl-androstan-17β-ol-3-one.

In a similar way there can be prepared the following derivatives of testosterone and of androstan-17β-ol-3-one: 2α-ethyl-17α-methyl, 2α,17α-di-ethyl, 2α-ethyl-17α-propyl, 2α-propyl-17α-methyl, 2α-propyl-17α-ethyl, 2α,17α-dipropyl, 2α-benzyl-17α-methyl, 2α-benzyl-17α-ethyl and 2α-benzyl-17α-propyl.

*Example XII*

By essentially following the procedure described by A. Behal, A. Ch., 20, 417 (1900), there was prepared the mixed anhydride of formic and acetic acids, by reaction of acetic anhydride with anhydrous formic acid.

A mixture of 1 g. of 2α,17α-dimethyl-androstan-17β-ol-3-one, 2 g. of such anhydride and 20 cc. of pyridine was heated at 90° C. for 48 hours, cooled, poured into water and extracted with ethyl acetate; the extract was washed with dilute hydrochloric acid, then with 5% aqueous sodium bicarbonate solution and finally with water to neutral, dried over anhydrous sodium sulfate and the solvent was evaporated; recrystallization of the residue from aqueous methanol afforded the 17-formate of 2α,17α-dimethyl-androstan-17β-ol-3-one, namely the 17-formate of 2α,17α-dimethyl-dihydrotestosterone.

*Example XIII*

Following the method described in Example XI, but starting from 2α-methyl-17α-ethyl dihydrotestosterone, there was obtained the 17-formate of 2α-methyl-17α-ethyl-dihydrotestosterone.

*Example XIV*

Following the method described in Example XI, except that the mixed anhydride of formic and acetic acids was replaced by acetic anhydride, there was obtained the 17-acetate of 2α,17α-dimethyl-dihydrotestosterone.

*Example XV*

A solution of 1 g. of 2α,17α-dimethyl-dihydrotestosterone in 20 cc. of pyridine was treated with 4 g. of cyclopentylpropionic anhydride and heated at 90° C. for 4 days, cooled, poured into ice water and extracted with methylene chloride; the extract was successively washed with dilute hydrochloric acid, 5% aqueous sodium bicarbonate solution and water, dried over anhydrous sodium sulfate and the solvent was evaporated; chromatography of the residue on neutral alumina furnished the 17-cyclopentylpropionate of 2α,17α-dimethyl-dihydrotestosterone.

*Example XVI*

Following the method of Example XIV, except that cyclopentylpropionic anhydride is replaced by caproic anhydride there was obtained the 17-caproate of 2α,17α-dimethyl-dihydrotestosterone.

*Example XVII*

Following the method of Example XI, 1 g. of 2α,17α-diethyl-dihydrotestosterone was treated with 2 g. of propionic anhydride to produce the 17-propionate of 2α,17α-diethyl-dihydrotestosterone.

*Example XVIII*

A mixture of 1 g. of 2α,17α-dimethyl-dihydrotestosterone, 50 cc. of acetic acid, 10 cc. of acetic anhydride and 1 g. of p-toluenesulfonic acid monohydrate was kept overnight at room temperature, poured into water, heated for half an hour on the steam bath, cooled and the precipitate was collected; it was then washed with 5% aqueous sodium bicarbonate solution and water, dried and recrystallized from methylene chloride-methanol, thus yielding the 17-acetate of 2α,17α-dimethyl-dihydrotestosterone.

*Example XIX*

A solution of 1 g. of 2α,17α-dimethyl-dihydrotestosterone in 50 cc. of benzene was treated with 2 g. of caproic anhydride and 500 mg. of p-toluenesulfonic acid monohydrate and kept at room temperature for 3 days; after pouring into water the benzene layer was separated, washed with aqueous sodium bicarbonate solution and water and the solvent was evaporated. Recrystallization of the residue from acetone-hexane afforded the caproate of 2α,17α-dimethyl-dihydrotestosterone, identical with that obtained in Example XVI.

*Example XX*

A solution of 10 g. of 19-nor-testosterone in 500 cc. of thiophene free benzene was mixed under nitrogen with 10 cc. of ethyl formate, followed by the addition in small portions of 3 g. of sodium hydride. The mixture was stirred for 5 hours and the resulting mixture of salts was collected by filtration, washed several times with benzene and dried. This mixture was added little by little to a stirred dilute hydrochloric acid solution which caused the formation of a precipitate. The stirring was continued for 30 minutes and the precipitate was collected, washed with distilled water and dried in vacuo. There was thus obtained 2-hydroxymethylene-19-nor-testosterone which was used for the next stage without further purification.

The 2-hydroxymethylene-19-nor-testosterone was added to a suspension of 700 mg. of sodium hydride in 200 cc. of benzene, mixed with 40 cc. of methyl iodide and the mixture was refluxed under an atmosphere of nitrogen. After 24 hours an additional 40 cc. of methyl iodide was added followed by another 40 cc. after 24 hours further, and the refluxing was continued for still 24 hours more. The cooled mixture was washed with 1% sodium hydroxide solution and the organic layer was evaporated to dryness under reduced pressure. Crystallization of the residue from acetone-hexane yielded 2-methyl-2-aldehydo-19-nor-$\Delta^4$-androsten-17β-ol-3-one.

This 2-methyl-2-aldehydo compound was dissolved in benzene and transferred to a column with 800 g. of activated alumina. After 24 hours the column was eluted with ethyl acetate and the eluates crystallized from acetone-hexane to produce 2α-methyl-19-nor-testosterone.

By essentially analogous methods, but using ethyl iodide instead of methyl iodide, there was prepared 2α-ethyl-19-nor-testosterone; there were also obtained, from the corresponding 17α-alkyl derivatives of 19-nor-testosterone, 2α,17α-dimethyl-19-nor-testosterone, 2α-methyl-17α-ethyl-19-nor-testosterone, 2α-ethyl-17α-methyl-19-nor-testosterone and 2α,17α-diethyl-19-nor-testosterone respectively.

*Example XXI*

A solution of 1 g. of 2α-methyl-19-nor-testosterone, obtained in accordance with the previous example, in a mixture of 10 cc. of dioxane and 10 cc. of absolute ether was added dropwise and under continuous stirring to a blue solution of 0.05 g. of lithium metal in liquid ammonia. When the addition of the steroid was complete the solution had decolorized and then a small amount of lithium was added until the blue color persisted. 1.5 g. of solid ammonium chloride was added, the ammonia was allowed to evaporate, the residue was treated with water and chloroform and the organic layer was washed with dilute hydrochloric acid, sodium carbonate solution and water. The solvent was removed by distillation and the residue was dissolved in a mixture of benzene-hexane and chromatographed in a column of neutral washed alumina. There was thus obtained 2α-methyl-19-nor-androstan-17β-ol-3-one in pure form.

Similarly, the double bond of the other 19-nor-testosterones obtained in accordance with the previous example was reduced to produce: 2α-ethyl-19-nor-androstan-17β-ol-3-one, 2α,17α-dimethyl-19-nor-androstan-17β-ol-3-one, 2α - ethyl-17α-methyl-19-nor-androstan-17β-ol-3-one and 2α,17α - diethyl - 19 - nor-androstan-17β-ol-3-one, respectively.

*Example XXII*

A mixture of 1 g. of 2α-methyl-19-nor-testosterone, 20 cc. of pyridine and 2 cc. of acetic anhydride was kept at room temperature for 16 hours and then poured into ice water. The precipitate was collected by filtration, and crystallized from acetone-hexane, thus giving the acetate of 2α-methyl-19-nor-testosterone.

Similarly there was also prepared the acetate, propionate, cyclopentylproprionate, benzoate as well as other esters of hydrocarbon carboxylic acids of up to 12 carbon atoms of the character previously mentioned herein of 2α-methyl-19-nor-testosterone, of 2α-ethyl-19-nor-testosterone, of 2α-methyl-19-nor-androstan-17β-ol-3-one, of 2α-ethyl-19-nor-androstan-17β-ol-3-one. Similar esters of the 17-alkyl compounds such as 2α,17α-dimethyl-19-norandrostan-17β-ol-3-one, 2α - ethyl-17α - methyl-19-nor-androstan-17β-ol-3-one and 2α,17α-diethyl-19-nor-androstan-17β-ol-3-one, respectively were prepared in accordance with the procedure set forth in Examples XII, XIV, XV, XVI, XVII, XVIII and XIX.

This application is a continuation-in-part of our copending application Serial No. 632,016, filed January 2, 1957, now abandoned, and of our copending application Serial No. 636,860, filed January 29, 1957, now abandoned, and of our copending application Serial No. 702,763, filed December 16, 1957, now abandoned.

We claim:
1. A compound having the following formula:

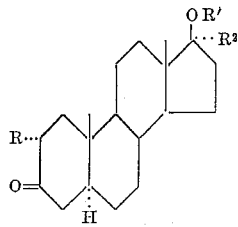

wherein R is selected from the group consisting of lower alkyl and benzyl; R' is selected from the group consisting of hydrogen and a hydrocarbon carboxylic acyl group containing up to 12 carbon atoms; R² is selected from the group consisting of hydrogen and lower alkyl.

2. 2α-lower alkyl-17α-lower alkyl-androstan-17β-ol-3-one.
3. 2α-benzyl-17α-lower alkyl-androstan-17β-ol-3-one.
4. 2α, 17α-dimethyl-androstan-17β-ol-3-one.
5. 2α-ethyl-17α-methyl-androstan-17β-ol-3-one.
6. 2α-lower alkyl-androstan-17β-ol-3-one.
7. 2α-methyl-androstan-17β-ol-3-one.
8. 2α-propyl-androstan-17β-ol-3-one.
9. 2α-benzyl-androstan-17β-ol-3-one.
10. The hydrocarbon carboxylic acid esters containing up to 12 carbon atoms of 2α-lower alkyl-17α-lower alkyl-androstan-17β-ol-3-one.
11. The acetate of 2α,17α-dimethyl-androstan-17β-ol-3-one.
12. The propionate of 2α,17α-diethyl-androstan-17β-ol-3-one.
13. The caproate of 2α,17α-dimethyl-androstan-17β-ol-3-one.
14. The hydrocarbon carboxylic acid esters containing up to 12 carbon atoms of 2α-lower alkyl-androstan-17β-ol-3-one.
15. The propionate of 2α-methyl-androstan-17β-ol-3-one.
16. The phenylproprionate of 2α-methyl-androstan-17β-ol-3-one.
17. The acetate of 2α-methyl-androstan-17β-ol-3-one.
18. The benzoate of 2α-methyl-androstan-17β-ol-3-one.
19. A compound having the following formula:

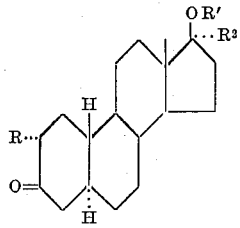

wherein R is selected from the group consisting of lower alkyl and benzyl; R' is selected from the group consisting of hydrogen and a hydrocarbon carboxylic acyl group of less than 12 carbon atoms; and R² is selected from the group consisting of hydrogen and lower alkyl.

20. 2α-lower alkyl-19-nor-androstan-17β-ol-3-one.
21. 2α-methyl-19-nor-androstan-17β-ol-3-one.
22. 2α-ethyl-19-nor-androstan-17β-ol-3-one.
23. The hydrocarbon carboxylic acid esters containing up to 12 carbon atoms of 2α-lower alkyl-19-nor-androstan-17β-ol-3-one.
24. The acetate of 2α-methyl-19-nor-androstan-17β-ol-3-one.
25. The propionate of 2α-methyl-19-nor-androstan-17β-ol-3-one.
26. 2α,17α - di-lower alkyl-19-nor-androstan-17β-ol-3-one.
27. 2α,17α-dimethyl-19-nor-androstan-17β-ol-3-one.
28. 2α - ethyl - 17α-methyl-19-nor-androstan-17β-ol-3-one.
29. A compound of the formula

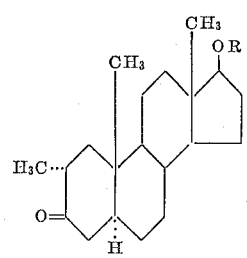

wherein R is selected from the group consisting of H and Ac; wherein Ac is the acyl radical of a hydrocarbon carboxylic acid containing from 2 to 3 carbon atoms.

30. A compound selected from the group consisting of those of the following formulas:

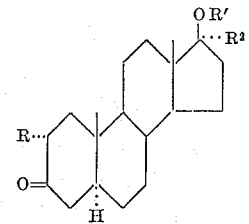

and

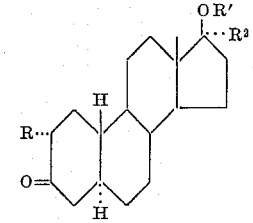

wherein R is selected from the group consisting of lower alkyl and benzyl; R' is selected from the group consisting of hydrogen and a hyrocarbon carboxylic acyl group containing up to 12 carbon atoms and R² is selected from the group consisting of hydrogen and lower alkyl.

References Cited in the file of this patent
UNITED STATES PATENTS

| | | |
|---|---|---|
| 2,756,244 | Djerassi et al. | July 24, 1956 |
| 2,902,497 | Colton | Sept. 1, 1959 |